United States Patent
Holstun et al.

[11] Patent Number: 6,154,230
[45] Date of Patent: Nov. 28, 2000

[54] FRACTIONAL DOT COLUMN CORRECTION FOR BETTER PEN-TO-PEN ALIGNMENT DURING PRINTING

[75] Inventors: Clayton Louis Holstun, San Marcos; William Edward Bland, Cardiff; Ian Nigel Kirkwood, La Jolla, all of Calif.

[73] Assignee: Hewlett-Packard Company, Palo Alto, Calif.

[21] Appl. No.: 09/186,746

[22] Filed: Nov. 5, 1998

Related U.S. Application Data

[63] Continuation-in-part of application No. 08/796,835, Feb. 6, 1997, Pat. No. 5,923,344.

[51] Int. Cl.[7] ............................................. B41J 29/393
[52] U.S. Cl. ..................... 347/19; 400/124.08; 400/76
[58] Field of Search ................... 347/9, 19; 400/124.08, 400/76

[56] References Cited

U.S. PATENT DOCUMENTS

| | | | |
|---|---|---|---|
| 4,626,867 | 12/1986 | Furukawa et al. | 346/1.1 |
| 5,049,898 | 9/1991 | Arthur et al. | 346/1.1 |
| 5,250,956 | 10/1993 | Haselby et al. | 346/1.1 |
| 5,350,929 | 9/1994 | Meyer et al. | 250/573 |
| 5,448,269 | 9/1995 | Beauchamp et al. | 347/19 |
| 5,480,240 | 1/1996 | Bolash et al. | 400/124.01 |
| 5,494,361 | 2/1996 | Sonoda | 400/120.07 |
| 5,600,350 | 2/1997 | Cobbs et al. | 347/19 |
| 5,604,597 | 2/1997 | Imai | 347/5 X |
| 5,847,722 | 12/1998 | Hackleman | 347/19 |

FOREIGN PATENT DOCUMENTS

| | | |
|---|---|---|
| 0539157A2 | 4/1993 | European Pat. Off. . |
| 0622236A2 | 11/1994 | European Pat. Off. . |
| 0622236A3 | 11/1994 | European Pat. Off. . |
| 0775587A1 | 5/1997 | European Pat. Off. . |
| 0858049A2 | 8/1998 | European Pat. Off. . |

*Primary Examiner*—John S. Hilten
*Assistant Examiner*—Minh Chau

[57] ABSTRACT

Sub-pixel alignment is performed for dots from multiple printheads. In order to align, output from a first printhead is aligned with output from a second printhead, dot data is generated for the first printhead and for the second printhead. The dot data is generated from data input. The dot data indicates location of dots on a print medium. Dot shift data is used in order to make sub-pixel shifts in locations of first dots placed on the print medium by the first printhead in order to align the first dots placed on the print medium by the first printhead with second dots placed on the print medium by the second printhead. The first dots and the second dots are then placed on the print medium.

18 Claims, 13 Drawing Sheets

FRACTIONAL DOT COLUMN CORRECTION FOR BETTER PEN-TO-PEN ALIGNMENT DURING PRINTING

CROSS REFERENCE TO RELATED APPLICATION

This application is a continuation-in-part of application Ser. No. 08/796,835, filed Feb. 6, 1997, now U.S. Pat. No. 5,923,344, by Scott Norum, Clayton Holstun, Ronald A. Askeland, James A. Feinn, Jaime H. Bohorquez and James R. Schmedake for FRACTIONAL DOT COLUMN CORRECTION FOR SCAN AXIS ALIGNMENT DURING PRINTING.

BACKGROUND

The present invention concerns printers and pertains particularly to fractional dot column correction for better alignment of color dots during printing.

Thermal ink jet printers print by emitting ink droplets. The ink droplets are emitted by nozzles arranged on a printhead. Passive thermal inkjet heater circuitry is, for example, carried on a silicon chip. For general information on thermal inkjet printers, see for example, J. Stephen Aden, Jaime H. Bohórquez, Douglas M. Collins, M. Douglas Crook, André Garcia, and Ulrich E. Hess, The Third-Generation HP Thermal Inkjet Printhead, *Hewlett-Packard Journal*, February 1994, pp. 41–45.

It is possible for a thermal ink jet printer to emit discrete drops of a variable volume. For example, a pulse train of packets of pulses is used to generate drops comprising packets of connected or merged droplets. The reciprocal of the pulse repetition rate is greater than the bubble collapse time and the pulse packet rate is less than the maximum single droplet emission rate of the printhead. The individual droplets within the packet merge in flight to create a single drop whose volume depends upon the number of pulses contained within the pulse packet. See for example U.S. Pat. No. 4,503,444 issued to Christopher A. Tacklind, for METHOD AND APPARATUS FOR GENERATING A GRAY SCALE WITH A HIGH SPEED THERMAL INK JET PRINTER.

One issue when using a printhead with a large number of nozzles and a high resolution is correct alignment of all the nozzles so that the ink is correctly placed on the print media. Dot alignment can be done in both horizontal and vertical axes. The horizontal axis is generally referred to as the scan axis. The vertical axis is generally referred to as the paper advance axis (or just the paper axis).

Many factors can affect alignment. For example, slight variations during manufacturing can affect alignment. Additionally, the alignment of ink placed on a page can be dynamically affected during printing, for example dependent on the volume of a drop which is generated by merged droplets.

SUMMARY OF THE INVENTION

In accordance with the preferred embodiment of the present invention, sub-pixel alignment is performed for dots from multiple printheads. For example, output from a first printhead is aligned with output from a second printhead. Dot data is generated for the first printhead and for the second printhead. The dot data is generated from data input. The dot data indicates location of dots on a print medium. The dot shift data is used in order to make sub-pixel shifts in locations of first dots placed on the print medium by the first printhead in order to align the first dots placed on the print medium by the first printhead with second dots placed on the print medium by the second printhead. The first dots and the second dots are then placed on the print medium.

In the preferred embodiment, pulses are provided to the first printhead which result in ink being emitted through nozzles located on the first printhead. The pulses used to generate the first dots are selected from a train of firing pulses. The firing pulses within the train of firing pulses repeats at a frequency that is higher than the pixel frequency. Sub-pixel shifts in location of the first dots are performed by selecting different firing pulses to place the first dots on the print medium. The use of sub-pixel pulses can be used to align dots from multiple printheads.

When the dot shift data is used to perform sub-pixel alignment of the dots on the print medium, the dot shift data may be generated in a number of ways. For example, after manufacture, a printhead is tested for dot alignment. While still within the factory, the alignment information is encoded within the printhead or in the printer.

Alternatively, the dot shift data may be generated with the assistance of a user. In this case, the user instructs the printer to print a test pattern. Based on the test pattern, the user inputs coded information to the printer. The printer generates the dot shift data based on the coded information from the user.

Alternatively, the dot shift data may be generated autonomously by the printer. In this case, the printer prints a test pattern. The printer obtains alignment information based on the test pattern and generates the dot shift data based on the alignment information.

The present invention provides for a simple versatile means to align multiple printheads. The adjustment is done precisely without requiring extensive changes to hardware. The adjustment of dot placement facilitates alignment of color dots for improved printing quality.

DESCRIPTION OF THE PREFERRED EMBODIMENT

Figure 1:
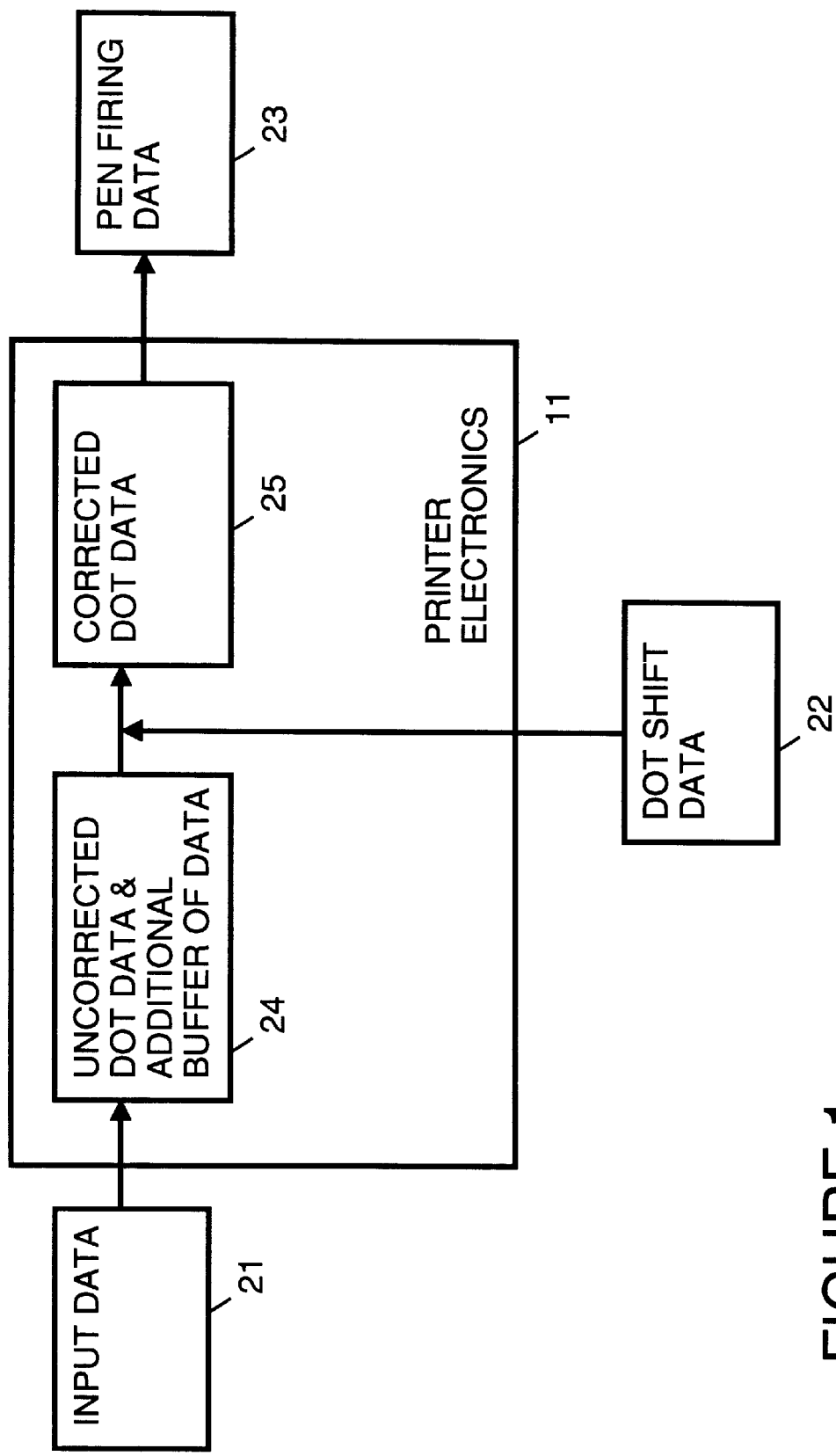
FIG. 1 shows how dot shift data can be utilized to align drops emitted from a printer in accordance with a preferred embodiment of the present invention.

FIG. 1 shows print electronics 11 receiving input data 21. Input data 21 includes information describing printed characters and/or images for printing. For example, input data 21 is in a printer format language such as Postscript, PCL 3, PCL 5, HPGL, HPGL 2 or some related version of these. Alternatively, input data 21 may be formatted as raster data or formatted in some other printer language. From input data 21, printer electronics 11 generates uncorrected dot data 24 for the printed characters and/or images. Uncorrected dot data 24 indicates the location and the drop volume for dots which will form the printed characters and/or images. Uncorrected dot data 24 is stored in an additional buffer within printer electronics 11, which serves to buffer uncorrected dot data 24 to allow the modification of uncorrected dot data 24. Printer electronics 11 modifies uncorrected dot data 24, using dot shift data 22, in order to produce corrected dot data 25. Corrected dot data 25 is used by printer electronics 11 to produce pen (printhead) firing data 23 which is used to control the nozzles of an ink jet printer. Firing data 23 could be used, for example, for a thermal ink jet printer or for other types of ink jet printers such as piezo ink jet printers or even printers which use technology other than ink jets.

Some printers include multiple printheads used, for example, to provide for color printing. For example, color printer ink jet printers often include a different pen (printhead) for each color. For example, a typical color printer may utilize inks of three different colors (e.g., cyan, magenta and yellow). Even when three color printing is implemented using separate nozzles on a single printhead, a separate printhead may be use for black ink. Using separate printheads during printing can present significant alignment problems.

Alignment issues can increase in significance as the number of inks per printer is increased. For example, photographic inkjet printers typically use six inks, including two densities, dilutions or shades of cyan ink (cyan dark and cyan light), two densities, dilutions or shades of magenta ink (magenta dark and magenta light), yellow and black. There are often separate printheads for each color. By overlaying drops of ink, color ink jet printers provide enormous capabilities for production of both subtle and rich color effects, halftoning and color control. Optimizing ink usage per pixel, constraining colors to a maximum number of drops per pixel, making fullest use of the capability of multiple ink, multiple drop systems to produce a reasonably complete gamut—with smooth-appearing color gradations—and minimizing graininess are all goals. Alignment of dots produced by ink drops is an important ingredient in producing a sharp finished product.

The dynamic introduction of dot shift data 22 by printer electronics 11 in order to produce corrected dot data 25 allows for dynamic alignment of dots on the print medium by varying the time of the occurrence of pulses which control the emission of ink drops from the nozzles of one or more printheads.

Figure 2:
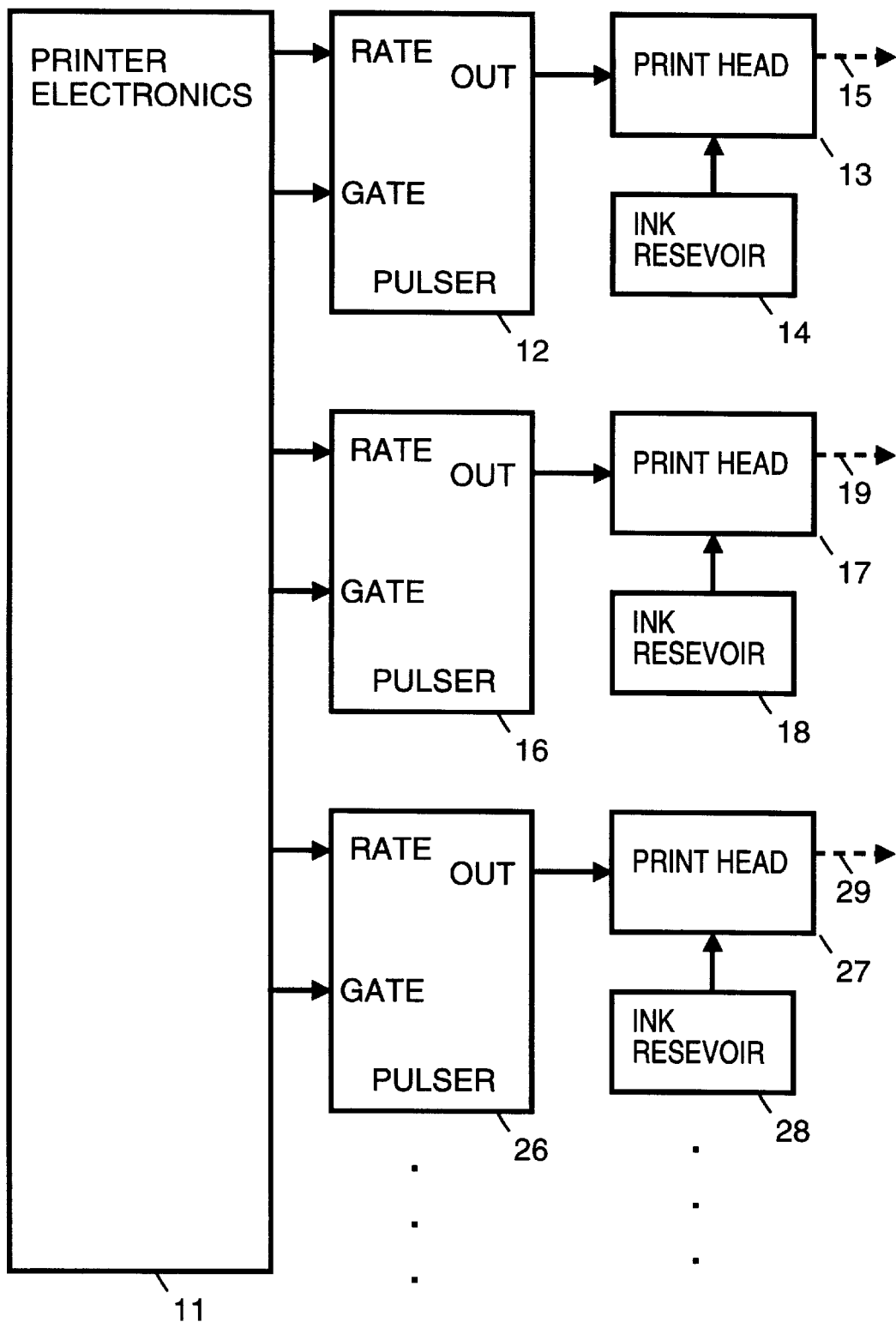
FIG. 2 illustrates firing data utilized to generate an implementation which shows how drops are emitted from printheads in accordance with a preferred embodiment of the present invention.

For example, as shown in FIG. 2, pen (printhead) firing data is used by a pulser 12 to generate pulses which control a nozzle 13 located on a printhead. Pulser 12 may be located on or off the printhead, depending on the particular implementation of the present invention. In the example shown in FIG. 2, printer electronics provides to pulser 12 pen firing data on two lines. Information on the first line sets the pulse rate and information on the second line indicates which pulses are to be forwarded to nozzle 13. The pulses forwarded to nozzle 13 are forwarded as a current pulse which is applied to a resistor associated with nozzle 13. The current pulse causes an ink droplet 15, formed from ink within an ink reservoir 14, to be emitted from nozzle 13.

The pen (printhead) firing data is also used by a pulser 16 to generate pulses which control a nozzle 17 located on a separate (second) printhead. Pulser 16 may be located on or off the second printhead, depending on the particular implementation of the present invention. Printer electronics provides to pulser 16 pen firing data on two lines. Information on the first line sets the pulse rate and information on the second line indicates which pulses are to be forwarded to nozzle 17. The pulses forwarded to nozzle 17 are forwarded as a current pulse which is applied to a resistor associated with nozzle 17. The current pulse causes an ink droplet 19, formed from ink within an ink reservoir 18, to be emitted from nozzle 17.

The pen (printhead) firing data is also used by a pulser 26 to generate pulses which control a nozzle 27 located on a third printhead. Pulser 26 may be located on or off the printhead, depending on the particular implementation of the present invention. Printer electronics provides to pulser 26 pen firing data on two lines. Information on the first line sets the pulse rate and information on the second line indicates which pulses are to be forwarded to nozzle 27. The pulses forwarded to nozzle 27 are forwarded as a current pulse which is applied to a resistor associated with nozzle 27. The current pulse causes an ink droplet 29, formed from ink within an ink reservoir 28, to be emitted from nozzle 27.

In the preferred embodiment of the present invention, alignment is controlled by varying the timing of a pulse on which the ink drop(s) for a particular dot are fired from a nozzle varies the scan axis alignment of the dot on the page.

Figure 3:
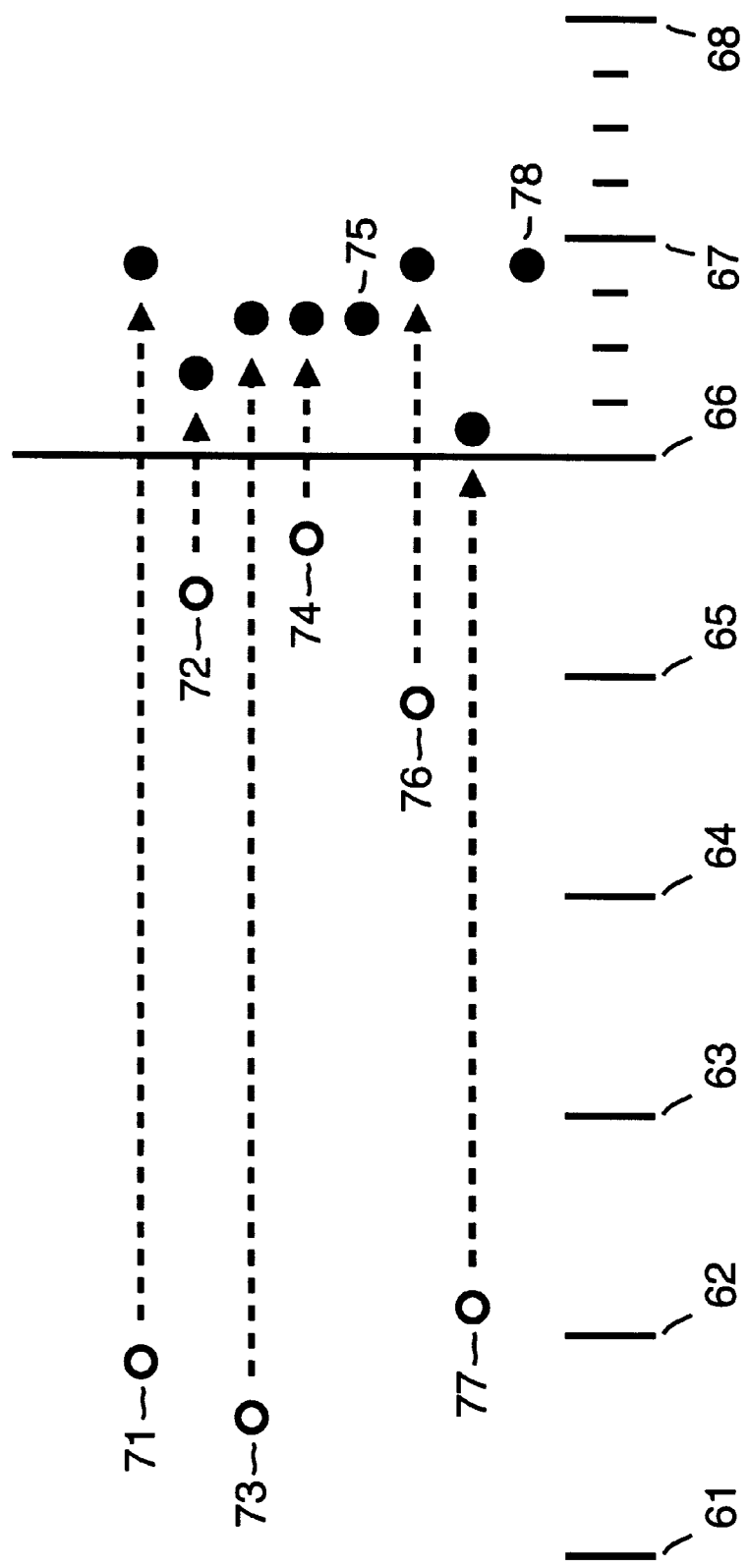
FIG. 3 illustrates pixel alignment of drops on a print medium.

FIG. 3 illustrates pixel alignment of drops on a print medium. Scale lines 61, 62, 63, 64, 65, 66, 67 and 68 show spacing on a page for 600 dots per inch (dpi) printing. Dots 71, 72, 73, 74, 75, 76, 77 and 78 (whose sizes are not to scale), are dots utilized by the printer to create a vertical line. The vertical line is to be composed of dots within the horizontal pixel region defined between scale lines 66 and 67. Before pixel alignment, dots 71, 72, 73, 74, 76 and 77 are not within the horizontal pixel region defined between scale lines 66 and 67, as represented by "open dots" for each of dots 71, 72, 73, 74, 76 and 77. These dots are pixel aligned by firing the associated nozzles earlier or later. These shifts in the time of firing the associated nozzles are turned into shifts in space on the print media by the motion of the printhead relative to the print medium.

In the example shown in FIG. 3, assuming the printhead movement is from left to right, the ink drop for dot 71 is fired five 600 dpi columns late in order to align dot 71 within the horizontal pixel region defined between scale lines 66 and 67. The ink drop(s) for dot 72 is fired one *600* dpi column late in order to align dot 72 within the horizontal pixel region defined between scale lines 66 and 67. The ink drop(s) for dot 73 is fired five 600 dpi columns late in order to align dot 73 within the horizontal pixel region defined between scale lines 66 and 67. The ink drop(s) for dot 74 is fired one 600 dpi column late in order to align dot 74 within the horizontal pixel region defined between scale lines 66 and 67. The ink drop(s) for dot 76 is fired two 600 dpi columns late in order to align dot 76 within the horizontal pixel region defined between scale lines 66 and 67. The ink drop(s) for dot 77 is fired four 600 dpi columns late in order to align dot 77 within the horizontal pixel region defined between scale lines 66 and 67.

Figure 4:
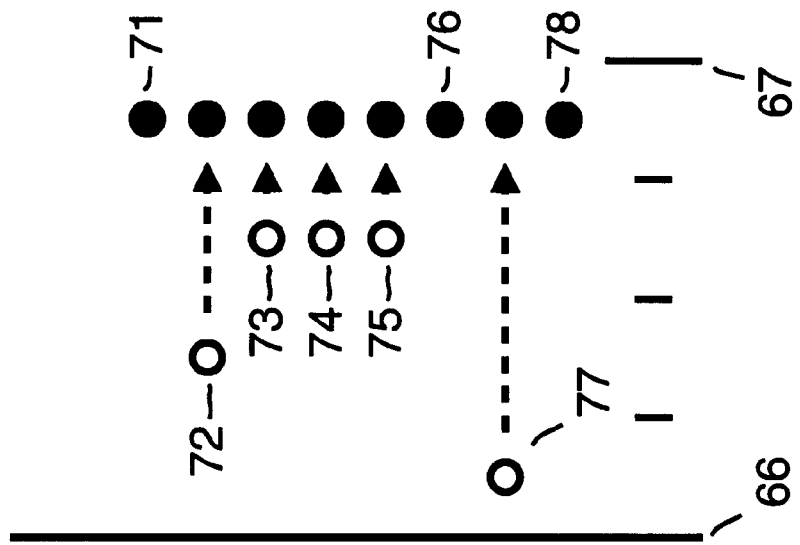
FIG. 4 illustrates sub-pixel alignment of drops on a print medium in accordance with a preferred embodiment of the present invention.

FIG. 4 illustrates sub-pixel alignment of drops on a print medium. Sub-scale lines shown between pixel scale lines 66 and 67 show pulse spacing on a page when four pulses are fired for each 600 dots per inch (dpi) pixel. Dots 71, 72, 73, 74, 75, 76, 77 and 78 (whose sizes are not to scale), are aligned in a vertical line. During sub-pixel alignment, dots 72, 73, 74, 75 and 77 are additionally aligned by time shifting the pulses used to generate these dots. These shifts in the time of firing the associated nozzles are turned into shifts in space on the print media by the movement of the printhead relative to the print medium.

In the example shown in FIG. 4, assuming the movement of the printhead is from left to right, the ink drop for dot 72 is fired two pulses late in order to align dot 72. The ink drop for dot 73 is fired one pulse late in order to align dot 73. The ink drop for dot 74 is fired one pulse late in order to align dot 74. The ink drop for dot 75 is fired one pulse late in order to align dot 75. The ink drop for dot 77 is fired three pulses late in order to align dot 77.

Figure 5:
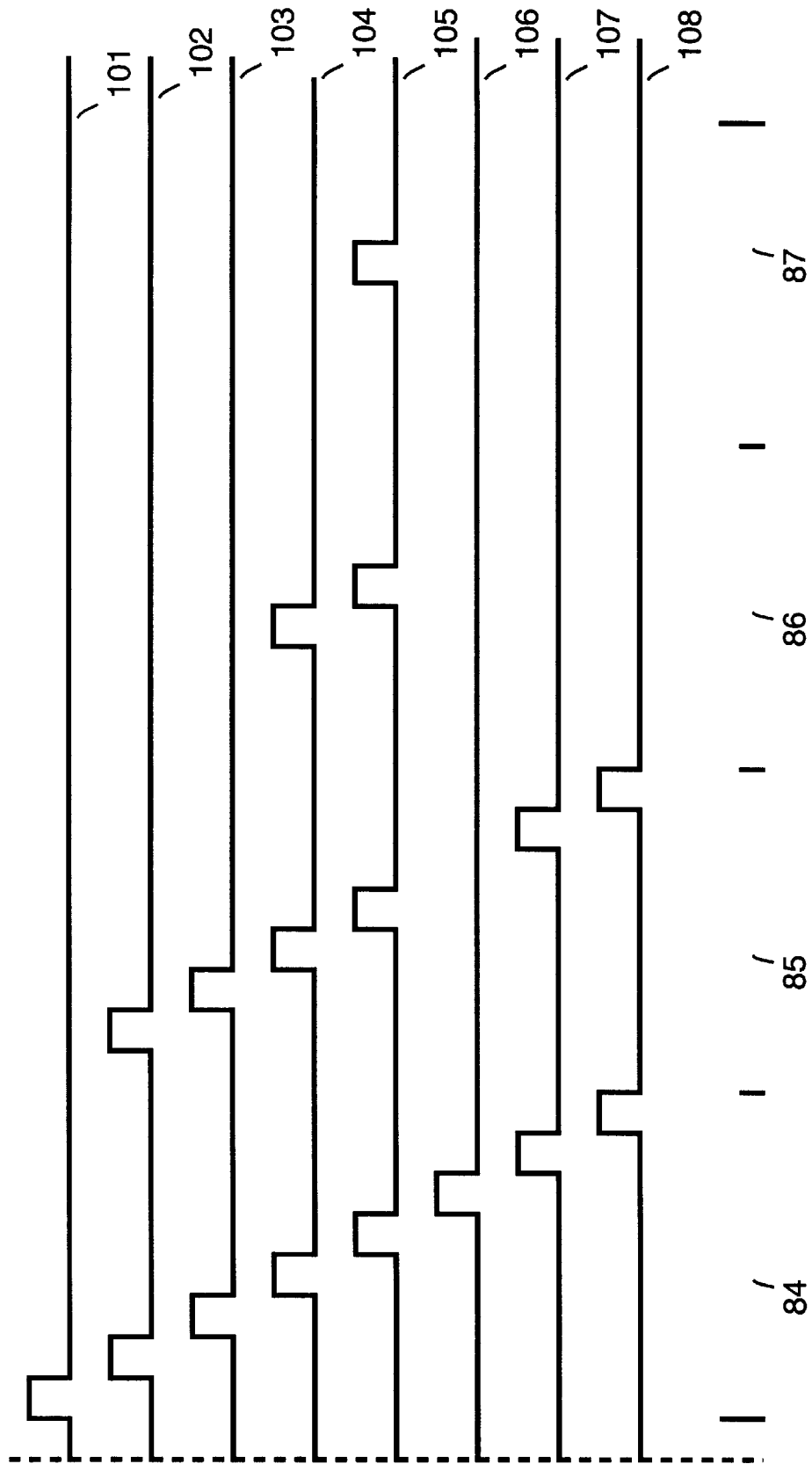
FIG. 5 and FIG. 6 illustrates generation of pulses for sub-pixel alignment of drops of variable volume on a print medium in accordance with a preferred embodiment of the present invention.
Figure 6:
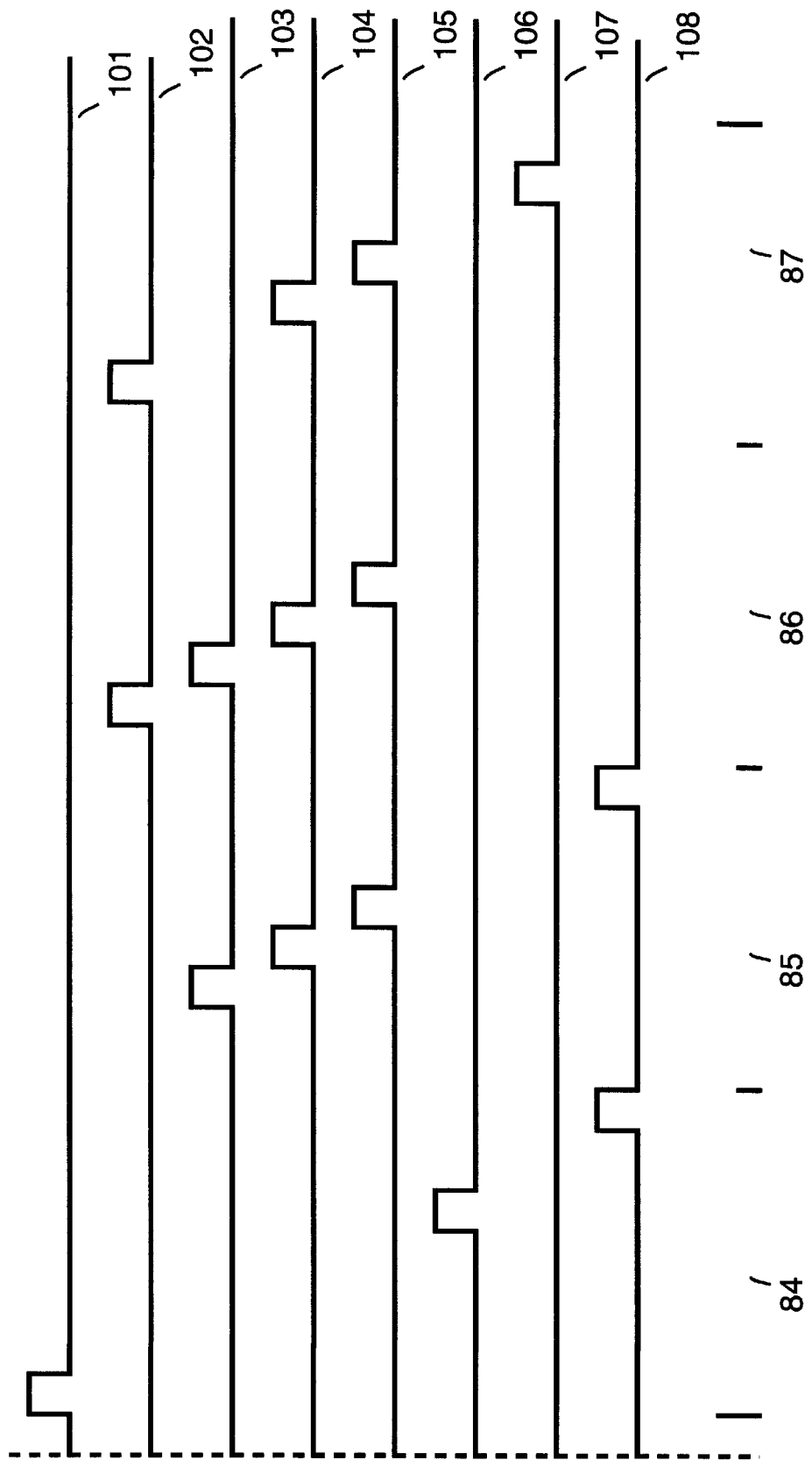

FIGS. 5 and 6 illustrates the pulses utilized to generate dots 71 through 78. Spacing of the pulses is shown in order to accurately perform the sub-pixel alignment. For the example illustrated by FIG. 5, dot 71 is generated using one pulse (i.e., is created from a drop which has a volume of one droplet), dot 72 is generated using two pulses (i.e., is created from a drop which has a volume of two droplets), dot 73 is generated using two pulses (i.e., is created from a drop which has a volume of two droplets), dot 74 is generated using three pulses (i.e., is created from a drop which has a volume of three droplets), dot 75 is generated using four pulses (i.e., is created from a drop which has a volume of four droplets), dot 76 is generated using one pulse (i.e., is created from a drop which has a volume of one droplet), dot 77 is generated using two pulses (i.e., is created from a drop which has a volume of two droplets) and dot 78 is generated using two pulses (i.e., is created from a drop which has a volume of two droplets).

Each of pulse intervals 84, 85, 86 and 87 when translated into space, represents a position one fourth of a 600 dpi column in width. In other words, there are potentially four pulses per dot, allowing the drops generated to vary in volume from one to four droplets. Also, the dots may be varied increments of one fourth times 600 dpi, or 2400 dpi. The occurrence of the pulse within the interval for each signal is staggered in order to allow for sufficient current to be generated for each pulse. While the present example utilizes four pulses per 600 dpi column, resolution may be increased (or decreased), for example, using eight pulses per 600 dpi column.

FIG. 5, given for reference, illustrates the case where there is no sub-pixel alignment. In FIG. 5, signal 101, which generates dot 71, has a first pulse in pulse interval 84. The two pulses in a signal 102 used to generate dot 72 occur in pulse interval 84 and pulse interval 85. The two pulses in a signal 103 used to generate dot 73 occur in pulse interval 84 and pulse interval 85. The three pulses in a signal 104 used to generate dot 74 occur in pulse intervals 84, 85 and 86. The four pulses in a signal 105 used to generate dot 75 occur in pulse intervals 84, 85, 86 and 87. Signal 106, which generates dot 76, has a first pulse in pulse interval 84. The two pulses in a signal 107 used to generate dot 77 occur in pulse intervals 84 and 85. Signal 108, which generates dot 78, has a first pulse in pulse interval 84 and a second pulse in pulse interval 85.

FIG. 6 shows changes made to the signals shown in FIG. 5 when the sub-pixel alignment has been performed. In FIG. 6, signal 101, which generates dot 71, has a first pulse in pulse interval 84. As illustrated by FIG. 4, the ink drop for dot 72 needs to be shifted two positions to the right in order to be aligned with dot 71. Therefore, the two pulses in a signal 102 used to generate dot 72 occur beginning in pulse interval 86. The ink drop for dot 73 needs to be shifted one position to the right in order to be aligned with dot 71. Therefore, the two pulses in a signal 103 used to generate dot 73 occur beginning in pulse interval 85. The ink drop for dot 74 needs to be shifted one position to the right in order to be aligned with dot 71. Therefore, the three pulses in a signal 104 used to generate dot 74 occur beginning in pulse interval 85. The ink drop for dot 75 needs to be shifted one position to the right in order to be aligned with dot 71. Therefore, the four pulses in a signal 105 used to generate dot 75 occur beginning in pulse interval 85 (the fourth pulse is not shown). Signal 106, which generates dot 76, has a first pulse in pulse interval 84. The ink drop for dot 77 needs to be shifted three positions to the right in order to be aligned with dot 71. Therefore, the two pulses in a signal 107 used to generate dot 77 occur beginning in pulse interval 87 (the second pulse is not shown). Signal 108, which generates dot 78, has a first pulse in pulse interval 84 and a second pulse in pulse interval 85.

Figure 7:
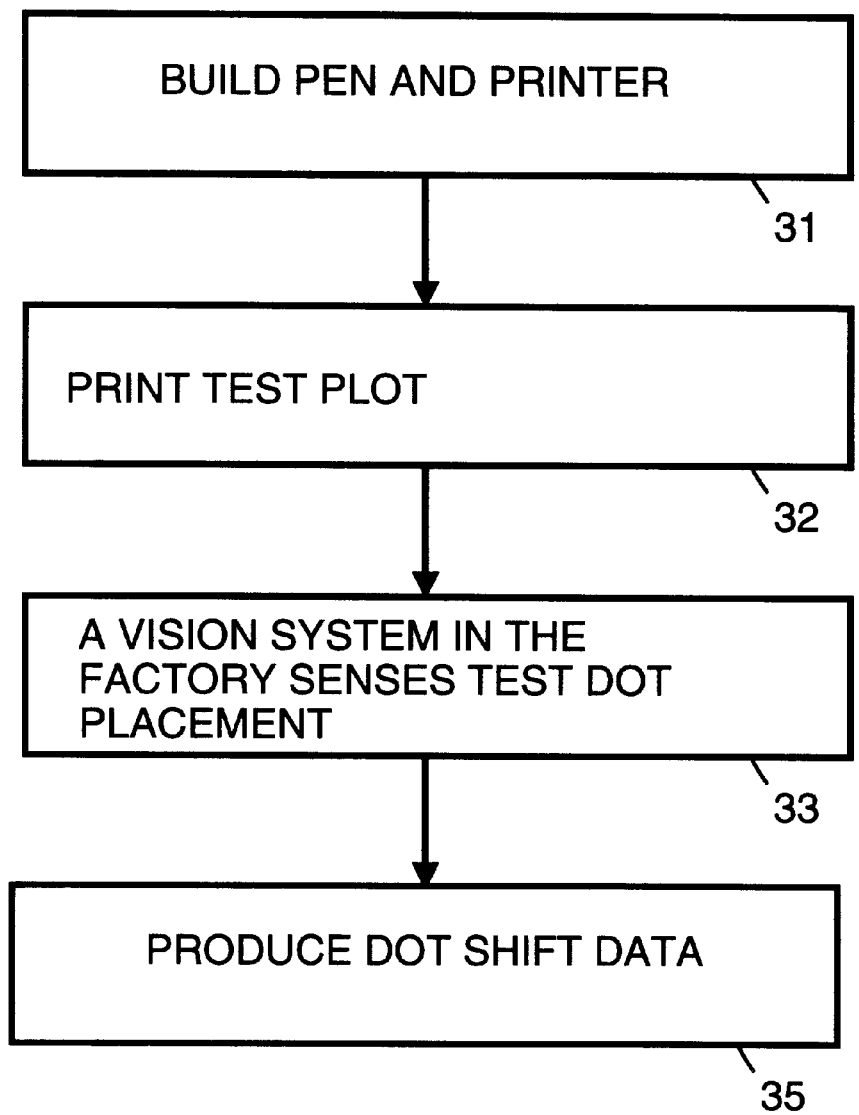
FIG. 7 is a flowchart which describes generation of dot shift data in accordance with a preferred embodiment of the present invention.

As described above, the amount of shift for each nozzle is controlled by dot shift data 22. To take into account alignment, dot shift data 22 may be generated in a number of ways. For example, FIG. 7 shows one method.

In a step 31, the pen (printhead) and printer is built. In a step 32, in the factory, the printer prints a test plot. In a step 33, a vision system senses the test dot placement. From this placement testing, (while the pen is in the printer) it can be determined if drops from a particular nozzle on the pen needs to be fired early or late in order to be aligned properly. This information is encoded on the pen (or encoded in the printer). The information indicates for each nozzle the number of pulses early or late the nozzle should be fired.

In a step 35 dot shift data 22 is generated. Dot shift data 22 indicates for each nozzle the number of pulses early or late the nozzle should be fired.

Figure 8:
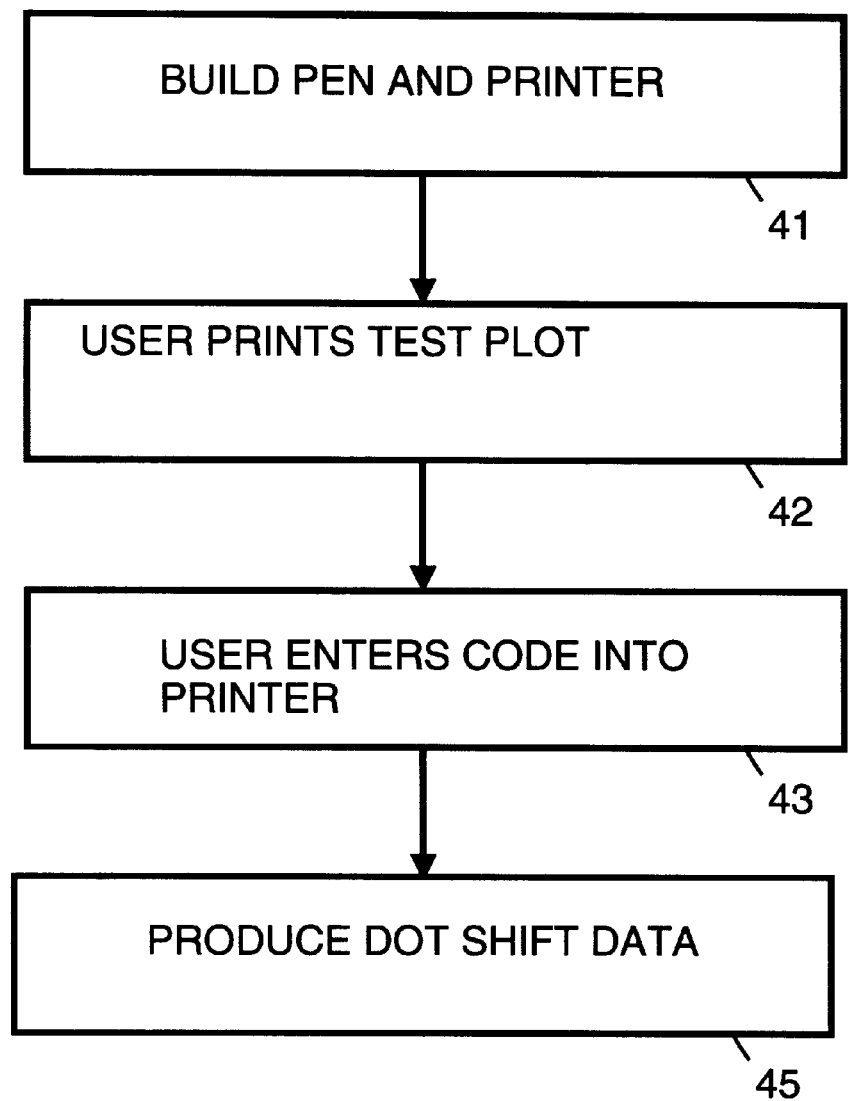
FIG. 8 is a flowchart which describes generation of dot shift data in accordance with an alternative preferred embodiment of the present invention.

FIG. 8 shows an alternative method for generating dot shift data 22. In a step 41, the pen (printhead) and printer is built. In a step 42, the user of the printer in which the printhead is installed prints a test plot. Based on the test plot, as compared with additional information provided to the user, in a step 43, the user enters a code into the printer. The code contains information which indicates for each nozzle the number of pulses early or late the nozzle should be fired. In a step 45, the printer utilizes the code entered by the user and generates dot shift data 22. Dot shift data indicates for each nozzle the number of pulses early or late the nozzle should be fired.

Figure 9:
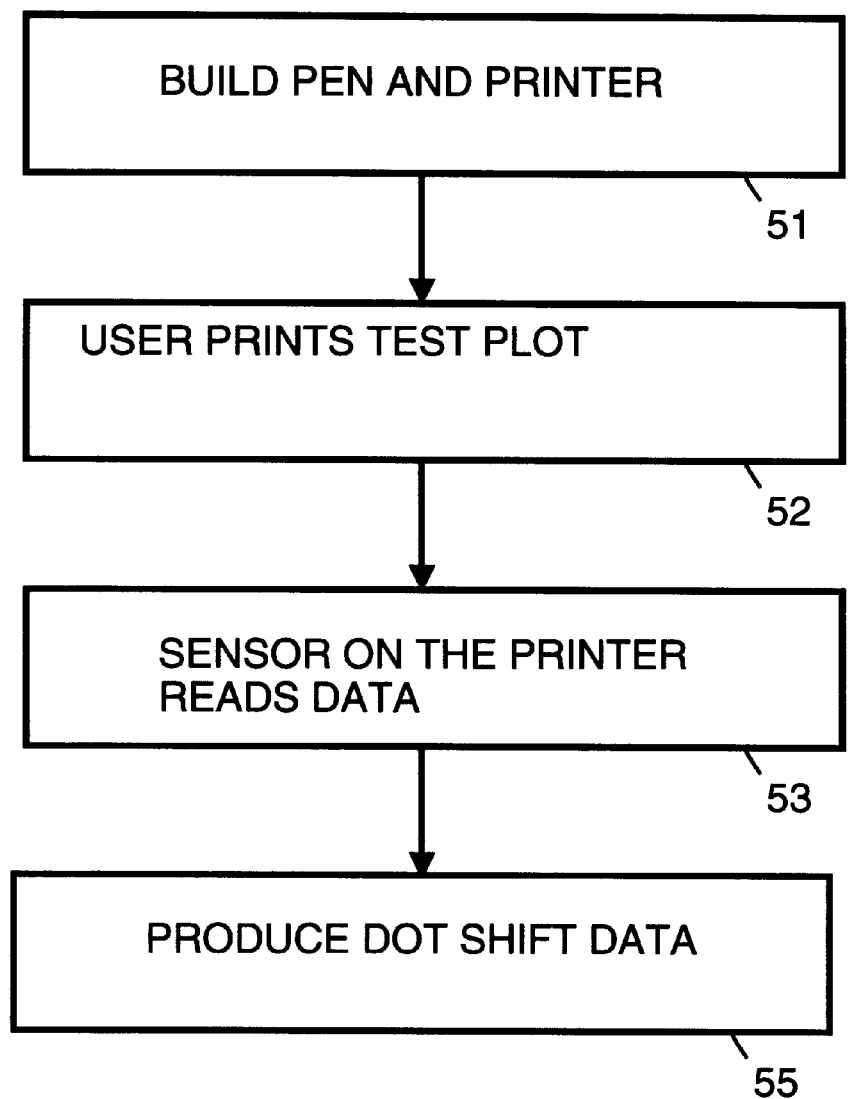
FIG. 9 is a flowchart which describes generation of dot shift data in accordance with another alternative preferred embodiment of the present invention.

FIG. 9 shows another alternative method for generating dot shift data 22. In a step 51, the pen (printhead) and printer is built. In a step 52, the user of the printer in which the printhead is installed prints a test plot. In a step 53, a sensor within the printer reads and interprets the test plot. In a step 55, the printer utilizes the interpretation of the test plot to generate dot shift data 22. Dot shift data indicates for each nozzle the number of pulses early or late the nozzle should be fired.

Figure 10:
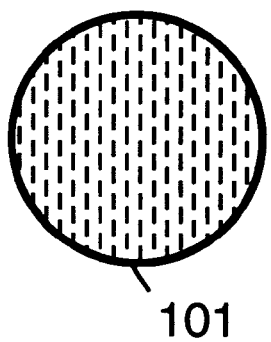
FIG. 10, FIG. 11, FIG. 12 and FIG. 13 illustrate pen-to-pen correction alignment between pens which produce different colors in accordance with a preferred embodiment of the present invention.
Figure 11:
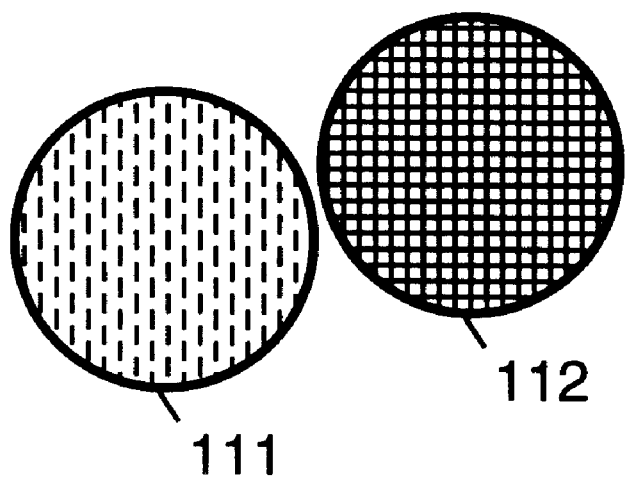
Figure 11:
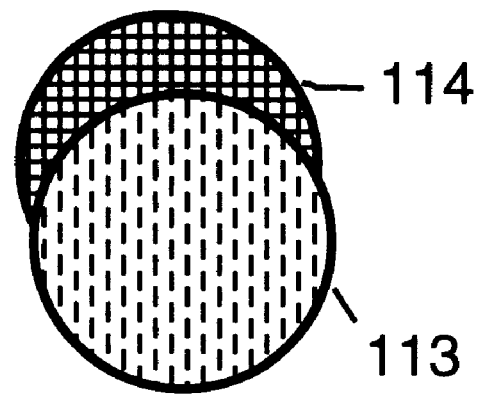
Figure 12:
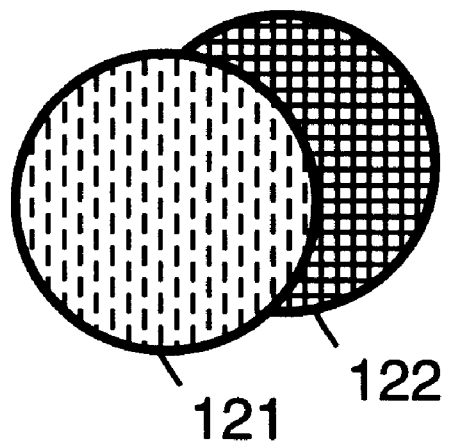
Figure 12:
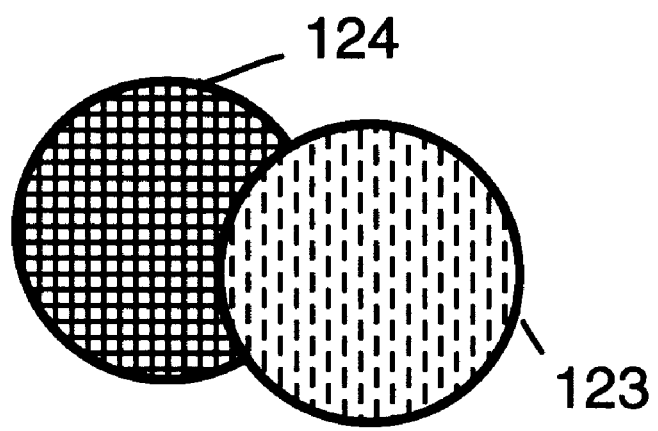

FIGS. 10 through 12 illustrate how dot shift data 22 can be used to increase alignment between printheads, for example in a color inkjet printer which utilizes different printheads for each color. In such a system, printheads must be aligned relative to each other so that, as nearly as possible, dots fired from different printheads can result in the correct color mixture.

For example, FIG. 10 illustrates output resulting from a magenta printhead producing a magenta drop 101 and a yellow printhead producing a yellow drop 102. In order to produce the color red, a magenta drop 103 is placed on top of a yellow drop 104. In FIG. 10, magenta drop 103 and yellow drop 104 are almost perfectly aligned.

In FIG. 11, a magenta drop 111 and a yellow drop 112 are almost exactly 1 dot column misaligned. In a system that allows dot alignment to a resolution of at least one dot, the magenta printhead that generated magenta drop 111 could be aligned by one dot column so that a magenta drop 113 is placed on top of a yellow drop 114 in such a way that magenta drop 113 and yellow drop 114 are almost perfectly aligned.

In FIG. 12, a magenta drop 121 and a yellow drop 122 are less than ½ dot column misaligned. A one dot column alignment of the magenta printhead would actually increase misalignment, as illustrated by a magenta drop 123 placed on top of a yellow drop 124 so that magenta drop 123 and yellow drop 124 are more than ½ dot column misaligned.

In a printing system, as discussed above, where multiple pulse printing allows column alignment to be varied by fractions of a dot column, it is possible to shift either the firing time of the magenta printhead or the yellow printhead fractionally to allow better alignment of output.

Figure 13:
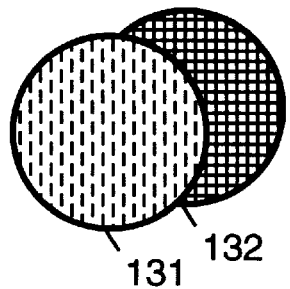
Figure 13:
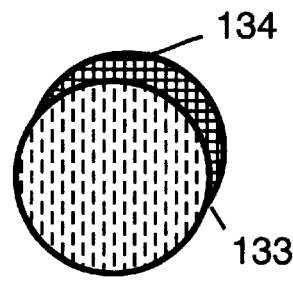
Figure 13:
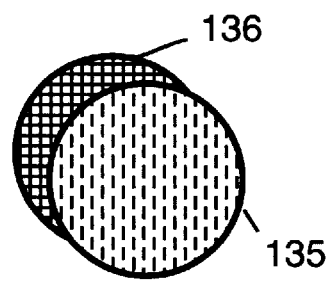
Figure 13:
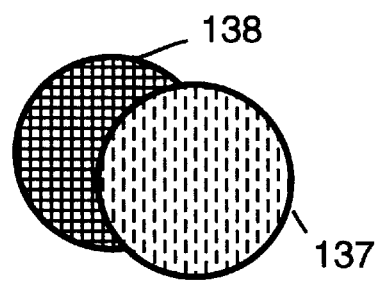
Figure 13:
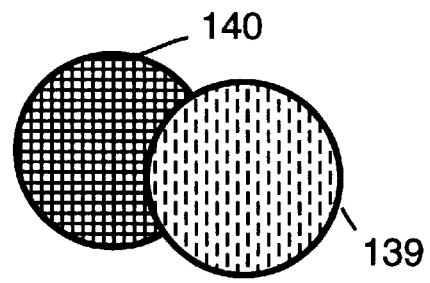

For example, in FIG. 13, a magenta drop 131 and a yellow drop 132 are less than ½ dot column misaligned. A ¼ dot column alignment of the magenta printhead would increase alignment, as illustrated by a magenta drop 133 placed on top of a yellow drop 134 so that magenta drop 133 and yellow drop 134 are very closely aligned. A ½ dot column alignment of the magenta printhead would also produce acceptable alignment, as illustrated by a magenta drop 135 placed on top of a yellow drop 136 so that magenta drop 135 and yellow drop 136 are very closely aligned. During alignment, either the ¼ dot column alignment of the magenta printhead or the ½ dot column alignment of the magenta printhead would produce acceptable print results.

A ¾ dot column alignment of the magenta printhead would result in poor alignment, as illustrated by a magenta drop 137 placed on top of a yellow drop 138 so that magenta drop 137 and yellow drop 138 are very significantly misaligned. A one dot column alignment of the magenta printhead would also produce unacceptable results, as illustrated by a magenta drop 139 placed on top of a yellow drop 140 so that magenta drop 139 and yellow drop 140 are significantly misaligned.

The technique illustrated by FIGS. 10, 11 and 12 is used to align printheads for all the colors. For example, the target locations for dots of black ink are not shifted while the target locations for cyan, magenta and yellow dots can be shifted to be aligned with the locations for the black ink dots.

The present invention can also be used to align pens within a printhead which are fired during different passes. This is helpful, for example, when three color printing is implemented using separate nozzles on a single printhead. Each color is printed, for example during separate passes of the printhead over the print media. Misalignment of the nozzles on the printhead can happen for example, when the printhead is slightly rotationally misaligned on the printer. This can result in nozzles at the top of the printhead printing dots which are slightly forward or slightly backward (depending on the direction of rotational misalignment) of dots placed by nozzles at the bottom of the printhead. The generated dot shift data can be used to correct this misalignment.

The present invention can also be used to align pens which fire things other than ink. For example, liquid solutions may be placed either under or over ink, for example, to aid drying, or to alter the surface of the print media. Regardless of the substance used to form the dots, the same alignment techniques can be used.

As is clear from the above discussion, using dot shift data 22 to shift target locations when printing combining colors results in improved alignment. This can also help avoid unwanted Moiré patterns which are created when the different colors are all targeted at the same location and have very slight offsets from that target location. This technique can be used to simulate usage of a different screen angle for each color printed, as is done for commercial printing.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for alignment of output from a first printhead with output from a second printhead, the method comprising the following steps:

(a) generating for the first printhead and the second printhead, from data input, dot data which indicates location of dots on a print medium;

(b) using dot shift data in order to make sub-pixel shifts in locations of first dots placed on the print medium by the first printhead in order to align the first dots placed on the print medium by the first printhead with second dots placed on the print medium by the second printhead; and, (c) placing the first dots and the second dots on the print medium;

wherein step (c) is performed utilizing a train of firing pulses firing pulses within the train of firing pulses repeating at a frequency that is higher than a pixel frequency; and wherein in step (b) sub-pixel shifts in location of the first dots are performed by selecting different firing pulses to place the first dots on the print medium.

2. A method as in claim 1 wherein in step (c) the first dots are a different color than the second dots.

3. A method as in claim 1 wherein in step (c) the second dots are black dots.

4. A method as in claim 1 wherein the dot shift data in step (b) is generated using the following steps:

(d) printing a test pattern;

(e) receiving from a user coded information based on the test pattern printed in step (d);

(f) generating, by the printer, the dot shift data based on the coded information.

5. A method as in claim 1 wherein the dot shift data in step (b) is generated using the following steps:

(d) printing a test pattern;

(e) obtaining, by the printer, alignment information based on the test pattern printed in step (d);

(f) generating, by the printer, the dot shift data based on the alignment information.

6. A method as in claim 1 wherein step (c) includes the following substeps:
   (c.1) providing pulses to the first printhead which result in ink being emitted through nozzles located on the first printhead; and
   (c.2) providing pulses to the second printhead which result in ink being emitted through nozzles located on the second printhead.

7. A method as in claim 6 wherein in substep (c.1) when placing the first dots on the print medium, sub-pixel shifts in locations of the first dots is achieved by shifting data to different firing pulses.

8. A printer comprising:
   a first printhead which places first dots on a print medium;
   a second printhead which places second dots on the print medium; and
   printer electronics, coupled to the first printhead and to the second printhead, which, from print data input, generate dot data which indicates location of the first dots on the print medium and location of the second dots on the print medium, the printer electronics including:
      sub-pixel adjustment means for using dot shift data in order to make sub-pixel shifts in locations of the first dots on the print medium;
   wherein in response to the dot data the first print head places the first dots on the print medium and the second print head places the second dots on the print medium;
   wherein the first printhead utilizes a train of firing pulses to place the first dots on the print media, firing pulses within the train of firing pulses repeating at a frequency that is higher than a pixel frequency; and
   wherein the sub-pixel adjustment means performs sub-pixel shifts in location of the first dots by selecting different firing pulses to be used by the first printhead to place the first dots on the print medium.

9. A printer as in claim 8 wherein the printer electronics generates the dot shift data from coded information received from a user.

10. A printer as in claim 8 wherein the printer electronics generates the dot shift data from alignment information the printer obtains from a printed test pattern.

11. A printer as in claim 8 wherein the printer electronics provides pulses to the first printhead which result in ink being emitted through a nozzle located on the first printhead.

12. A printer as in claim 8 wherein the first dots are a different color than the second dots.

13. A printer as in claim 8 wherein the second dots are black dots.

14. A printer as in claim 8 additionally comprising:
   a third printhead, coupled to the printer electronics, which places third dots on the print medium;
   wherein the dot data generated by the printer electronics also indicates location of the thirds dots on the print medium;
   wherein the sub-pixel adjustment means additionally uses the dot shift data in order to make sub-pixel shifts in locations of the third dots on the print medium; and
   wherein in response to the dot data the third print head places the third dots on the print medium.

15. A method for alignment of output from a first printhead and output from a second printhead with output from a third printhead, the method comprising the following steps:
   (a) generating for the first printhead, the second printhead and the third printhead, from data input, dot data which indicates location of dots on a print medium;
   (b) using dot shift data in order to make sub-pixel shifts in locations of first dots placed on the print medium by the first printhead and in locations of second dots placed on the print medium by the second printhead in order to align the first dots placed on the print medium by the first printhead and the first dots placed on the print medium by the first printhead with third dots placed on the print medium by the third printhead; and,
   (c) placing the first dots, the second dots and the third dots on the print medium;
   wherein step (c) is performed utilizing a train of firing pulses, firing pulses within the train of firing pulses repeating at a frequency that is higher than a pixel frequency; and
   wherein in step (b) sub-pixel shifts in location of the first dots are performed by selecting different firing pulses to place the first dots on the print medium and sub-pixel shifts in location of the second dots are performed by selecting different firing pulses to place the second dots on the print medium.

16. A method for alignment of output from different passes of a printhead, the method comprising the following steps:
   (a) generating from data input, for a first pass and a second pass, dot data which indicates location of dots on a print medium;
   (b) using dot shift data in order to make sub-pixel shifts in locations of a subset of the dots to be placed on the print medium in order to align first dots placed on the print medium during the first pass with second dots placed on the print medium during the second pass; and,
   (c) performing the first pass and the second pass to place the first dots and the second dots on the print medium;
   wherein step (c) is performed utilizing a train of firing pulses, firing pulses within the train of firing pulses repeating at a frequency that is higher than a pixel frequency; and
   wherein in step (b) sub-pixel shifts in location of the first dots are performed by selecting different firing pulses to place the subset of the dots on the print medium.

17. A method as in claim 16 wherein in step (c) the first dots are a different color than the second dots.

18. A method as in claim 16 wherein in step (c) the second dots are black dots.

* * * * *